No. 728,274. PATENTED MAY 19, 1903.
H. K. MOORE.
ELECTROLYTIC CELL.
APPLICATION FILED AUG. 29, 1901.
NO MODEL.
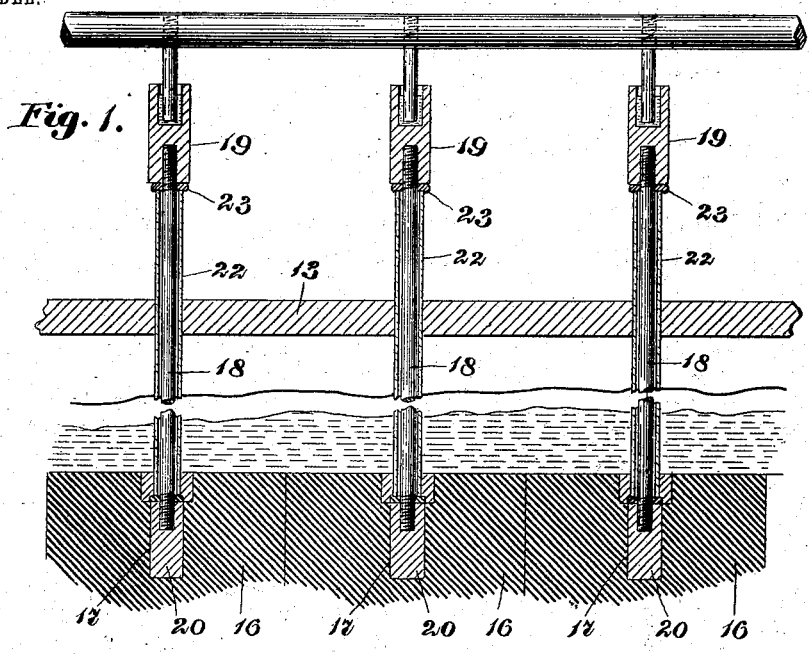
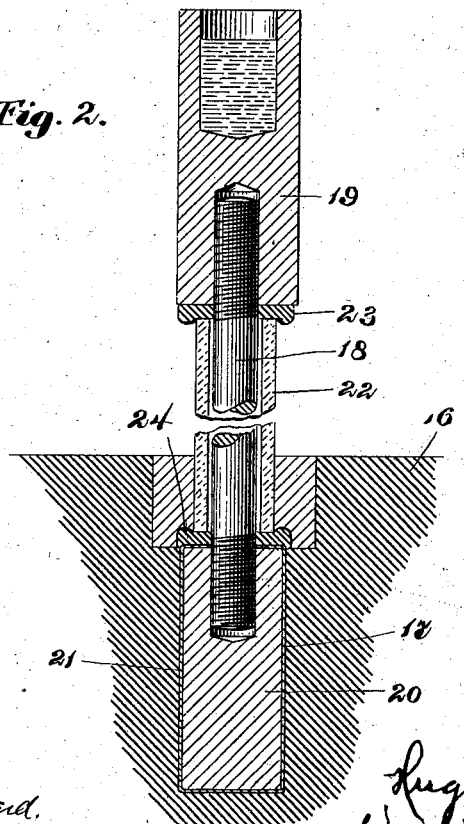

No. 728,274.                                              Patented May 19, 1903.

UNITED STATES PATENT OFFICE.

HUGH K. MOORE, OF LYNN, MASSACHUSETTS, ASSIGNOR TO MOORE ELECTROLYTIC COMPANY, OF PORTLAND, MAINE, AND BOSTON, MASSACHUSETTS, A CORPORATION OF MAINE.

ELECTROLYTIC CELL.

SPECIFICATION forming part of Letters Patent No. 728,274, dated May 19, 1903.

Application filed August 29, 1901. Serial No. 73,662. (No model.)

*To all whom it may concern:*

Be it known that I, HUGH K. MOORE, of Lynn, in the county of Essex and State of Massachusetts, have invented certain new and useful Improvements in Electrolytic Cells, of which the following is a specification.

This invention has relation to electrolytic cells, and particularly to that class of cells in which the anode is formed of carbon or equivalent material.

In electrolyzing saline solutions, as for the production of chlorin and caustic soda, much trouble has been experienced in the employment of carbon as the anode, this being largely due to the difficulty in effecting a satisfactory electrical connection between the carbon and the conductor. Hitherto it has been the practice to cast the end of the carbon in a lead backing or holder, and consequently the current of electricity has been compelled to traverse the entire length of the anode, thus increasing the total resistance of the cell. This resistance gradually increases in such cells and causes a materially higher voltage in the working current. The reason for the increase I have found to be due to the porosity of the carbon, which permits the aqueous solution to work up by capillary action and precipitate at the juncture of the carbon and lead. The layer of dry salt thus formed by precipitation being a non-conductor of electricity greatly increases the electrical resistance at that point, and the heat caused thereby aids the precipitation of more salt until the resulting layer effects an increase in the voltage greatly in excess of what has been determined to be economical.

According to my present invention I employ one or more relatively short pieces of carbon for the anode and connect it or them with the conductor in such way as to prevent the precipitation of the salt and an increase in the electrical resistance. Each carbon is hung upon a rod formed of copper or equivalent metal which has a high coefficient of expansion and is a good conductor of electricity. The carbon which has a low coefficient of expansion is bored to form a socket for the rod. Between the copper and the carbon I place a bushing of material which is of high electrical conductivity with a coefficient of expansion between that of copper and carbon and which is likewise unaffected by chlorin. Platinum, iridium, iridia-platinum or other metals may be employed for this purpose. With this construction it will be observed that the heat generated by the passage of electricity causes the expansion of the platinum into firm electrical contact with the carbon and the greater expansion of the copper into similar electrical contact with the platinum. The copper rod is covered to prevent its corrosion by the chlorin, any suitable material being employed for this purpose, such as a glass tube inclosing the rod. The rod may project upward through the cell-cover and be equipped with a mercury-cup to receive the end of the conductor.

Referring to the accompanying drawings, Figure 1 represents a portion of an electrolytic cell equipped with my improvements. Fig. 2 shows the anode and its connections in detail.

The cell in its general characteristics is not materially different from the one described in my application, Serial No. 14,786, filed April 23, 1900. The anode consists of a plurality of pieces of carbon 16, gas-carbon being preferably employed for this purpose on account of its hardness and its resistance to disintegration. Each carbon 16 has a bored socket 17 to receive the rod by which electricity is conducted thereto. The conducting-rods are shown at 18 and are formed of copper. A mercury-cup 19 is screw-threaded upon the upper end of each, and to the lower end is similarly secured a small cylindrical block 20, likewise of copper. This block is incased within a layer 21 of platinum, iridium, iridia-platinum, or osmium, which completely and tightly covers it and which fits snugly in the socket 17. Between the cup 19 and the block 20 there is a glass tube 22, having its ends closed by rubber packing-rings or gaskets 23 24, forced toward each other by the adjustable cup 19. By this construction that part of the rod which projects through the chlorin-space is covered by the glass tube to prevent its being attacked by chlorin, whereas the platinum prevents the corrosion of the copper block 20 and the precipitation of the salt thereon. The socket 17 may extend to the center of the carbon, so that the current will be distributed more equally to the operative faces thereof, and consequently the cell may be run with a lower voltage than has hitherto been possible commercially.

In the claims wherever I employ the terms "copper" or "platinum" I use them generically to cover their equivalents.

Having thus explained the nature of the invention and described a way of constructing and using the same, although without attempting to set forth all of the forms in which it may be made or all of the modes of its use, I declare that what I claim is—

The combination of a cell-receptacle having a chlorin-space, a cover above said space, a carbon anode having a socket, a copper block in said socket, a casing in said block having a coefficient of expansion between that of copper and carbon, a conductor passing through said cover and having a threaded connection with said block, a terminal block on the end of said conductor, and a glass tube inclosing said conductor and clamped between said blocks.

In testimony whereof I have affixed my signature in presence of two witnesses.

HUGH K. MOORE.

Witnesses:
MARCUS B. MAY,
C. C. STECHER.